United States Patent [19] [11] 4,409,250
Van Hulle et al. [45] Oct. 11, 1983

[54] METHOD FOR PREPARING SUGAR COATED, PUFFED SNACKS UPON MICROWAVE HEATING

[75] Inventors: Glenn J. Van Hulle, Brooklyn Park; Charles A. Anker; Dean E. Franssell, both of Minneapolis, all of Minn.

[73] Assignee: General Mills, Inc., Minneapolis, Minn.

[21] Appl. No.: 43,572

[22] Filed: May 29, 1979

[51] Int. Cl.³ .......................... A21D 2/18; A21D 2/36; A21D 8/02; A21D 8/06

[52] U.S. Cl. .................... 426/242; 426/94; 426/302; 426/446; 426/458; 426/496; 426/559; 426/621; 426/625; 426/639; 426/653; 426/808

[58] Field of Search ................ 426/94, 103, 241, 242, 426/302, 549, 559, 560, 621, 625, 639, 653, 658, 661, 446, 458, 465, 496, 512, 516, 808

[56] References Cited

U.S. PATENT DOCUMENTS

| | | | |
|---|---|---|---|
| 2,868,647 | 1/1959 | Vollink | 426/302 |
| 3,027,258 | 3/1962 | Markakis | 426/808 X |
| 3,094,947 | 6/1963 | Green et al. | 426/290 |
| 3,246,990 | 4/1966 | Thompson et al. | 426/446 X |
| 3,253,533 | 5/1966 | Benson | 99/323.4 X |
| 3,464,827 | 9/1969 | Tsuchiya et al. | 426/302 X |
| 3,506,454 | 4/1970 | Reesman | 426/242 |
| 3,539,356 | 11/1970 | Benson et al. | 426/560 X |
| 3,600,192 | 8/1971 | Tanaka et al. | 426/462 X |
| 3,600,193 | 8/1971 | Glabe et al. | 426/808 X |
| 3,652,294 | 3/1972 | Marotta et al. | 426/446 X |
| 3,656,966 | 4/1972 | Ball et al. | 426/94 |
| 3,687,687 | 8/1972 | Liepa | 426/550 X |
| 3,689,279 | 9/1972 | Bedenk | 426/620 X |
| 3,703,379 | 11/1972 | Cummisford et al. | 426/808 X |
| 3,704,133 | 11/1972 | Kracaver | 426/103 X |
| 3,753,728 | 8/1973 | Bedenk et al. | 426/550 X |
| 3,800,050 | 3/1974 | Popel | 426/808 X |
| 3,814,822 | 6/1974 | Henthorn et al. | 426/293 |
| 3,849,582 | 11/1974 | Blagdon et al. | 426/808 X |
| 3,851,081 | 11/1974 | Epstein | 426/446 X |
| 3,876,811 | 4/1975 | Bonner et al. | 426/621 X |
| 3,950,567 | 4/1976 | Tomlinson | 426/625 |
| 3,966,990 | 6/1976 | Cremer et al. | 426/549 X |
| 3,983,256 | 9/1976 | Norris et al. | 426/94 |
| 4,178,392 | 12/1979 | Gobble et al. | 426/103 X |
| 4,211,800 | 7/1980 | Scharschmidt et al. | 426/621 X |

FOREIGN PATENT DOCUMENTS 593159   2/1960   Canada .............................. 426/621

OTHER PUBLICATIONS

Peterson et al., *Encyclopedia of Food Science*, 1978, pp. 707–709.

*Primary Examiner*—Arthur L. Corbin
*Attorney, Agent, or Firm*—Gene O. Enockson; John A. O'Toole

[57] ABSTRACT

Disclosed are food compositions and methods for preparing sugary coated puffed snack products upon simple heating of the food compositions in a consumer microwave oven. The food compositions comprise a plurality of puffable farinaceous dough puff pieces or pellets and a puffing media throughout which the puff pieces or pellets are dispersed. The puffing media comprises from about 40% to 95% by weight of a nutritive carbohydrate sweetening agent and from about 5% to 10% moisture. The weight ratio of puffing media to puff pieces ranges between about 4:1 to 0.1:1. The water activity of the food compositions is less than about 0.75. The method for making a coated snack comprises forming a gelatinized dough, shaping the dough into pieces, partially drying the pieces, dispersing the pieces throughout a puffing media to form a puffing media/piece matrix, and microwave heating the matrix to simultaneously puff the pieces and to enrobe the pieces with the fluidized puffing media.

4 Claims, No Drawings

METHOD FOR PREPARING SUGAR COATED, PUFFED SNACKS UPON MICROWAVE HEATING

BACKGROUND OF THE INVENTION

1. Field of the Invention

The present invention relates to food compositions and methods of preparation. More particularly, the present invention relates to coated snack food products of puffable farinaceous doughs and to the microwave puffing of preformed pieces of such doughs.

2. The Prior Art

It has long been known that certain farinaceous materials will expand or puff under appropriate heating conditions and will retain the expanded size upon cooling. Basically, such farinaceous materials are puffed by causing trapped moisture to expand from the liquid state to the vapor phase. Rapid heating or rapid depressurizing are the methods commonly used to convert hard, dense farinaceous dough pieces into the more palatable puffed porous crisp snack pieces.

Gun puffing exemplifies puffing by rapid depressurizing and is commonly used to prepare ready-to-eat breakfast cereals. Such products are generally prepared by puffing whole cereal grains or by puffing preformed pieces or pellets of cooked doughs prepared from various farinaceous materials. (See, for example, U.S. Pat. No. 3,253,533 issued May 31, 1966 to John O. Benson and U.S. Pat. No. 3,246,990 issued Apr. 19, 1966 to J. J. Thompson et al). The puffing pieces prior to being puffed are referred in the art as "half products" or "snack preforms". Nutritionally fortified dough formulations for gun puffing are also known (see, for example U.S. Pat. No. 3,687,687 issued Aug. 29, 1972 to Alexander L. Liepa; U.S. Pat. No. 3,689,279 issued Sept. 5, 1972 to William T. Bedenk; U.S. Pat. No. 3,753,728, issued Aug. 21, 1973 to William T. Bedenk et al; and U.S. Pat. No. 3,851,081 issued Nov. 26, 1974 to E. Epstein).

Deep-fat frying exemplifies puffing by rapid heating and is commonly used to prepare puffed snacks or dried food products (see, for example, U.S. Pat. No. 3,027,258 issued Mar. 27, 1962 to Markakies et al; U.S. Pat. No. 3,656,966 issued Apr. 18, 1972 to M. E. Ball et al; U.S. Pat. No. 3,600,193 issued Aug. 17, 1972 to E. F. Globe et al; U.S. Pat. No. 3,539,356 issued Nov. 10, 1970 to J. O. Benson et al; U.S. Pat. No. 3,666,511 issued May 30, 1972 to L. D. Williams et al; and U.S. Pat. No. 3,600,192 issued Aug. 17, 1971 to T. T. Kyoto et al). Commercially prepared puffed snacks of this type are widely sold.

While such puffed, deep-fat fried snacks are popular such snacks are not without disadvantages. Deep-fat fried puffed snacks typically have high fat levels which occasionally reach as high as 35% by weight. Such high fat levels render these snacks high in calories. The high fat levels also limit the shelf life of the puffed products even when carefully packaged.

Microwave heating has also been suggested as a rapid heating puffing method for various farinaceous materials including both cereals and snacks (see, for example, U.S. Pat. No. 3,652,294 issued Mar. 28, 1972 to N. G. Makotta et al; U.S. Pat. No. 3,703,379, issued Nov. 21, 1972 to P. D. Cummisford et al; and U.S. Pat. No. 3,849,582 issued Nov. 19, 1974 to P. A. Blagdon et al). Thus, with the increasing penetration of consumer microwave oven units into the home oven market, puffed snack products could be prepared at the consumer's convenience by microwave puffing of commercially prepared puffable farinaceous dough pellets.

While microwave methods of preparing puffed products could eliminate certain disadvantages inherent in deep-fat frying such as high fat content and limited shelf life, microwave puffing is also not without certain disadvantages. When pellets of puffable farinaceous doughs are subjected to microwave heating not all the pellets successfully puff. Doughs formulated primarily for puffing by other puffing methods have particularly poor microwave puff success rates. Those pellets which do not successfully puff can dry, harden and even char under microwave heating. Thus, since even small numbers of unsuccessfully puffed pellets can deleteriously affect overall product quality, high puff success rates are vital to the provision of a consumer acceptable product. Also, since the field distributions of consumer microwave ovens are not uniform, even successfully puffed pellets are subject to a phenomenon characterized herein as "hot spotting". Hot spotting is the localized over-heating of smaller regions of one or more pellets. Hot spotting can undesirably cause discoloration resulting in a visually unattractive puffed piece. Hot spotting can also result in the development of off-flavors due to localized charring.

Sugar coated puffed snacks and ready-to-eat cereals are also known (see, for example, U.S. Pat. No. 3,814,822, issued June 4, 1974 to L. J. Henthorn et al and U.S. Pat. No. 3,950,567 issued Apr. 13, 1975 to B. E. Tomlinson et al). Such coated products are typically prepared by first forming a puffed product and, thereafter, as a separate step combining the previously puffed product with a coating usually with simultaneous tumbling and high temperature heating (see, for example, U.S. Pat. No. 3,094,947 issued June 25, 1963 to J. Green et al). While such complex and inconvenient methods may be commercially practical to provide coated, puffed snacks, such methods of providing sugary coated, puffed snacks are not practical or are at least inconvenient for home preparation of coated, puffed snacks. Thus, it would be desirable to be able to prepare a sugary coated puffed snack conveniently by simply heating such as in a conventional consumer microwave oven whenever desired. Accordingly, it is an object of the present invention to provide food compositions and methods for the preparation of coated puffed snack products upon heating by conventional consumer microwave ovens.

It is a further object of the present invention to provide puffable food compositions having high puff success rates upon microwave heating.

It is a further object of the present invention to provide food products for preparing puffed snack products which minimize hot spotting upon microwave heating.

It is a further object of the present invention to provide processes for microwave puffing farinaceous dough pieces and simultaneously coating the puffed pieces with a sugared layer which upon cooling hardens into a glazed sugar coating.

It has been surprisingly discovered that the above objectives can be realized and superior puffable food compositions provided by formulating food compositions comprising a plurality of discreet puffable preformed farinaceous pieces and a puffing media through which the pieces are dispersed through or matrixed within. The puffing media comprise high levels of a nutritive carbohydrate sweetening agent and defined moisture levels.

SUMMARY OF THE INVENTION

The present invention relates to food compositions which, upon microwave heating, yield a crisp, frangible snack product enrobed with a glazed sugar coating. Such compositions comprise (a) a plurality of discreet pieces prepared from puffable farinaceous doughs and (b) a puffing medium throughout which the pieces are dispersed. The puffing medium, by providing a relatively uniform environment to the pieces, increases the puff success rate of the pieces while minimizes undesirable pellet hot spotting. Additionally, upon cooling, the puffing medium provides the puffed pieces with a glazed sugar coating.

The puffable pieces comprise conventional puffable farinaceous doughs and have moisture contents of between about 5% and 15% by weight of the dough. Preferred pieces are spherical pellets ranging between about 2 mm. to 20 mm. in diameter and between 0.01 g. to 6 g. in weight. Such pellets upon microwave heating expand gradually and upon cooling retain at least twice their original volume.

The puffing media of the present food compositions essentially comprise a nutritive carbohydrate sweetening agent and water. The moisture content of the puffing media is between about 5% to 10% by weight of the puffing media. The puffing media are essentially free (i.e., less than about 1% by weight) of protein so as to avoid undesirable nonenzymatic browning reactions upon snack product preparation or extended storage. The weight ratio of puffing media to puffable pieces ranges from about 0.1:1 to 4.0:1. The water activity of the present food compositions is less than about 0.75.

In its method aspect, the present invention comprises a method of preparing a sugar-coated snack product. The process involves forming a gelatinized starch-containing dough having a moisture content of between about 12% to 25% by weight. Then the dough is shaped into pieces and is partially dried. The partial drying reduces the moisture content of the shaped dough pieces to between about 5% to 15% by weight. The partial drying is accomplished at between 70° F. to 200° F. and at a relative humidity above 35%. The partially dried dough pieces are then matrixed within the puffing medium such as by simple dispersing therein or enrobing therewith. The matrix is then microwave heated in a conventional consumer microwave oven for about 1-4 minutes until the pieces have expanded in volume to several times their original size. After cooling to harden the sugar coating on the puffed pieces the prepared snacks are ready for consumption.

DETAILED DESCRIPTION OF THE INVENTION

The present invention relates to food composition, which upon simple microwave heating gradually form puffed, crisp snacks completely enrobed with a glazed sugar coating. In its method aspect, the present invention relates to processes for the preparation of such snacks. The present compositions essentially comprise (a) a plurality of discreet puffable pieces dispersed or matrixed in (b) a puffing media. Both of these composition components as well as methods of product preparation and composition use are described in detail below.

Throughout the specification and claims, percentages and ratios are by weight and temperatures are given in degrees Fahrenheit, unless otherwise indicated.

A. Puffable Pieces

The present food compositions essentially comprise a plurality of discreet puffable pieces which are dispersed through the microwave puffing media which are described in detail below. By the term "puffable" it is meant the ability of the "pieces" to expand gradually in volume upon microwave heating at conventional microwave oven frequencies (e.g., 2450 MHz) and to retain at least twice their original volume (hereinafter "2×") upon cooling. The term "piece" is used herein to refer to a shaped, gelatinized dough product which has not yet been subjected to sufficient heat to cause the product to puff. The term "pellet" is used herein to refer to highly preferred puffable piece embodiments of roughly spherical shape and generally weighing between 0.1 and 0.8 grams. In the following description it is to be understood that puffable pieces of various shapes can be used even though pellets are specifically described.

Pellets which are subject to explosion puffing such as popcorn as with case hardened surfaces are to be avoided. Such pellets upon puffing are automotive and undesirably cause splattering of the hot fluid puffing media through which the pellets are matrixed.

The puffable pellets herein are prepared from puffable gelatinized farinaceous doughs which have moisture contents essentially ranging between about 5% to 15% by weight of the pellets' dough, preferably from between about 9% to 13% and, most preferably, between about 11.5% and 12.5%. Maintenance of pellet dough moisture contents within the above given ranges is important to insure sufficient moisture to puff the pellets without scorching and to insure extended pellet shelf storage stability.

The art is replete with compositions suitable for use as the dough from which the puffable pellets are prepared, and the skilled artisan will have no problems formulating particular suitable doughs. For example, suitable doughs for the pellets are disclosed in U.S. Pat. No. 3,246,990 (issued Apr. 19, 1966 to J. J. Thompson et al), U.S. Pat. No. 3,464,827 (issued Sept. 2, 1969 to T. Tsuchiya et al), U.S. Pat. No. 3,600,193 (issued Aug. 17, 1971 to E. F. Glable et al), U.S. Pat. No. 3,666,511 (issued May 30, 1972 to L. D. Williams et al) and especially in U.S. Pat. No. 3,652,294 (issued Mar. 28, 1972 to N. G. Marotta et al) each of which is incorporated herein by reference.

In a highly preferred embodiment, the present pellets are formed from gelatinized doughs whose total amylopectin starch content ranges between about 30% to 95%. Such doughs are referred to herein as "amylopectin doughs". The term "total amylopectin starch content" refers to the combination of the naturally occurring starch present in any foodstuff which may be used in the dough formulation plus the added amylopectin starch in the formulation. The term "added amylopectin starch" is used to mean additional manufactured amylopectin starches which have been separated from naturally occurring foodstuffs and added to the formulation to increase the amylopectin content thereof. Amylopectin, of course, is that starch which is a branched polymer comprised of chains of alpha-D-(1→4) glucopyranosyl units with sidechains randomly attached to the main chains by alpha-D-(1→6)

glucopyranosyl linkages. (See Encyclopedia of Food Science, The Avi Publishing Company, Inc., Westport, Conn., 1978, pp. 707–710, which is incorporated herein by reference).

Although purified amylopectin is commercially available, the amylopectin can be readily supplied by waxy grain starches. Exemplary waxy grain starches include waxy maize, waxy millet, waxy sorghum, waxy milo and waxy rice starches. These waxy grain starches are derived from distinct genetic varieties of the named cereals. The designation "waxy" is derived from the glossy appearance of the grain kernel. Such waxy grain starches are mostly amylopectin.

In other embodiments of the present invention, the gelatinized doughs are prepared with all or part of the amylopectin being replaced with either potato or tapioca starch.

Dough Optional Components

A variety of materials can be added to the preferred amylopectin doughs to make the present puffed snacks more nutritious and more aesthetically or organoleptically desirable. Major optional ingredients usefully added to the preferred amylopectin doughs include additional starch materials, sucrose, various protein sources, shortening and common salt.

Cereals

Other farinaceous materials can be optionally included in the present amylopectin doughs. Representative of these materials are cereal flours or starches such as those of wheat (hard or soft), rice, buckwheat, arrowroot, oat, barley, rye or any combination of two or more. If present, such other farinaceous materials can comprise from about 1% to 40% of the amylopectin doughs.

Sucrose

Sucrose is another highly preferred optional component of the amylopectin dough embodiments for the pellet dough. If present, sucrose can comprise from about 0.1% to 15% of the dough and preferably between about 5% and 11%. Surprisingly, doughs containing sucrose exhibit increased puffing ability when puffed by microwave heating.

Protein

A protein source which is free (i.e., less than 2% by weight) of reducing sugars is another highly preferred optional component of the present amylopectin doughs. Such protein sources serve to increase the nutritional value of the present food products. If present, such protein sources comprise about 1% to 40% of the doughs.

Useful protein sources include, for example, cereal germs, vital gluten, soy flour, soy isolate and soy protein concentrate and mixtures thereof.

As used herein, soy flour refers to defatted and refined soybeans. Soy flour currently commercially available contains 40% to 60% protein (dry weight basis). Soy protein concentrate and soy protein isolate contain at least 70% and 90% protein (dry weight basis) respectively. The characteristic soy taste is less pronounced in the soy protein isolate and concentrate than in soy flour. Such products and their methods of preparation are more fully described in "Soybeans and Soybean Products," ed. by K. S. Markley, Interscience Publishers, Inc., New York, N.Y., Vol. 1 and 2 (1950) which is incorporated herein by reference.

Nonfat dry milk solids or cheese solids are to be avoided in the pellet amylopectin doughs since such materials undesirably contain reducing sugars. Doughs containing both reducing sugars and protein can undesirably undergo non-enzymatic browning reactions upon microwave heating.

Salt

Another highly preferred optional component of the present pellet amylopectin doughs is common salt. In addition to its seasoning function, salt surprisingly has a beneficial effect upon the puffing ability of the pellet amylopectin doughs even in the presence of sucrose. If present, salt comprises from about 0.1% to 10% of the pellet dough, preferably between 0.5% to 5% and most preferably between 1% and 2%.

Shortening

Most surprisingly, conventional shortenings can be added to the pellet amylopectin doughs without significantly effecting puffability. If present, such shortenings can comprise from about 0.1% to 10% of the doughs. Suitable conventional shortening materials include, for example, edible fatty triglyceridic materials derived from cottonseed oil, soybean oil, coconut oil, peanut oil and the like. Typically, such materials are partially hydrogenated to Iodine Values of less than about 90 to increase storage stability. Other suitable shortening materials and methods of preparation are described in Bailey "Industrial Oil and Fat Products," published by John Wiley & Sons, N.Y. (3rd Ed. 1964) which is incorporated herein by reference.

Minor Ingredients

Minor optional pellet amylopectin dough ingredients include, for example, colors, dyes, flavors, vitamins, preservatives and the like. If present, such minor optional components comprise from about 0.1% to 2% by weight of the pellet dough.

Dough Preparation

Generally, the essential dry dough materials such as amylopectin starch together with other optional ingredients such as cereals, sugar and salt are combined with water and are formed into gelatinized doughs. Such gelatinized doughs of course can be prepared in various well-known manners. For example, gelatinized doughs can be simply prepared by admixing water and pregelatinized starchy materials. Pregelatinized materials generally, and for purposes of the present invention, are those which swell in water which is at a temperature of 25° C. to the extent that one gram of the starch will absorb at least about 10 grams of water. This determination may be conducted by dispersing one gram of pregelatinized starch material and 100 mm. of water (at 25° C.) which is contained in a 100 mm. graduated cylinder and thereafter noting the volume displacement by the sediment which is formed. A sediment volume of at least 10 mm. qualifies the gelatinized starchy material as one suitable for use herein.

Alternatively, gelatinized doughs can be prepared by cooking to gelatinize doughs of non-pregelatinized materials. Other choices include using some pregelatinized material in combination with other non-pregelatinized materials which have been separately cooked and the two materials thus gelatinized are mixed together to form a gelatinized dough.

When non-pregelatinized material is used, the cooking or gelatinizing of the starch material is performed under conditions commonly used in the industry. Either a batch cooking or continuous cooking operation can be used. Different methods of cooking include heating at atmospheric pressure in an agitated kettle, heating at elevated pressure in a tumbling type mixer and heating under high pressure in a continuous mixer-extruder.

The preferred method of gelatinizing the starch material is by cooking in an extruder under pressure. Such a process is both continuous and flexible. For example, pregelatinized material, if used, can be simultaneously blended with the other starch material to yield a homogenous gelatinized dough. Additionally, the use of higher pressures attainable in the extruder allow the use of higher temperatures and also lower water levels than are possible with a batch type cooking operation. The use of lower water levels thus minimizes the amount of drying required in subsequent steps. Using an extrusion type process at 100 to 200 p.s.i.g. at about 250° to 350°, approximately 12% to 25% water based on the total moisture is sufficient to gelatinize the dough.

The gelatinized dough can be thereafter shaped into any desired geometric form of individual or discreet puffable pieces although spherical pellets are preferred. For the preparation of small pellets, the dough can be extruded in a wide variety of equipment and the extrudate cut off in the form of small pellets ranging in size between about 2 mm. to 20 mm. in diameter and generally weighing between 0.01 g. to 6 g.

After such shaping/sizing, the gelatinized dough pellets can be adjusted (e.g., partially dried) to a suitable puffing moisture within the essential 5% to 15% total moisture content range. Any method of conventional drying can be used to reduce the moisture content of the pellets. The drying operation can be accomplished using equipment such as rotary bed, tray and belt driers to form the present dried dough pellets. Simple hot air convection drying is the preferred method of pellet drying.

The drying process must be controlled so that the moisture transfer to the atmosphere of the drier from the pieces is uniform. If the moisture loss occurs only from the outer surface of the pellets while the inner portion of the pellets retain moisture, then the total moisture of the pellets may be within the required 5% to 15% range, but the pellets will not puff or expand properly during puffing. This poor puffing results from the starch material in the outer portions of the preformed pellets having little or no moisture with which to expand during the microwave puffing step. If the air convection drying operation is carried out at about 70° F. to 200° F. (relative humidity at least 35%) the pellets will be dried within about 4 hours and the moisture distribution within the pellets will be proper.

B. Puffing Media

The present food compositions essentially comprise the above-described puffable pieces dispersed in a puffing media. Surprisingly, the puffing media herein not only aid the puff success rate and decrease hot spotting, but also upon cooling provide a glazed, sugar coating to the puffed pieces.

The weight ratio of the puffing media to the puffable pieces dispersed therethrough essentially ranges between about 0.1:1 to 4.0:1. Better results in terms of puff success rate and uniformity of glazed coating are achieved, however, when the weight ratio of puffing media to half products or pellets ranges between about 3.0:1 to 1.6:1, i.e., when there is a substantial excess of puffing media to pellets.

The present puffing media essentially comprise a nutritive carbohydrate sweetening agent and water. It is essential that the puffing media be substantially free of protein sources (i.e., no more than 1% by weight of protein). In a highly preferred embodiment, the puffing media additionally comprise an edible fatty triglyceride.

Sweetening Agent

A nutritive carbohydrate sweetening agent is essentially present in the present puffing media at about 40% to 95% by weight. The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharin, cyclamate and the like. Additionally, the present carbohydrate sweetening agents are to be distinguished from such protein-based sweetening agents as aspartame, thaumatin, and monellin.

Suitable materials for use as nutritive carbohydrate sweetening agents are well known in the art. Examples of sweetening agents include both monosaccharide and disaccharide sugars whether reducing sugars or non-reducing sugars including, for example, sucrose, invert sugar, dextrose, lactose, honey, maltose, fructose, maple syrup and corn syrup solids. Preferred nutritive carbohydrate sweetening agents are those selected from the group consisting of sucrose, glucose, fructose, corn syrup solids and honey. Highly preferred nutritive carbohydrate sweetening agents are those selected from the group consisting of sucrose, corn syrup solid and fructose. Of course, mixtures of the above-noted materials are contemplated herein.

While the above exemplified sweetening agents are available in highly purified forms, other sources of sweetening agents which are not as highly purified can be used. For example, a relatively inexpensive material such as apple juice powder (or "apple powder" as it is commercially labeled) which is approximately 70% by weight (dry basis) sugars can be employed as the nutritive carbohydrate sweetening agent. Other sweetening agents include flavored syrups such as blueberry syrup, raspberry syrup and the like. If used, such impure sources of sugar are employed at levels based on their total sugars content. Up to 25% of the nutritive carbohydrate sweetening agent used herein can be supplied by such impure sweetening agents.

Moisture Content

The moisture content of the puffing media essentially ranges between about 5% to 12%. Better results are achieved when the moisture content of the puffing media range about between 7% to 9%. Maintenance of the moisture content of the puffing media is important not only to the extended shelf stability of the present food compositions, but also to the provision of puffing media with suitable rheological properties such that the puffing media upon microwave heating evenly coat the expanding pellets as they puff. Also, the moisture content is essential to the provision of puffed snacks with coatings which solidify upon cooling.

Importantly, the water which is contained by the present food compositions is present not totally in a free state but rather is partially bound. The degree to which water is bound in a food composition is characterized by the water activity of the food composition. The water activity of any food composition will be in the range of 0.00 to 1.00. The water activity of the present food products at equilibrium (24 hours) should range from about 0.30 to 0.75. Superior results in terms of storage stability are obtained when the water activity of the present food compositions ranges from about 0.45 to 0.7.

The water activity of the present food compositions is controlled by several factors. First, the total moisture content of the present food compositions influences measured water activity. Higher moisture contents tend to increase water activities. The water activities of the present food compositions can be influenced by the water-binding capacities of the ingredients employed to realize the present food compositions and the levels at which these materials are employed. When materials having high water-binding capacities are employed, the water activities are lower for a given moisture content. For example, sugars generally have higher water binding capacities than equivalent amounts of starches. However, water activity levels are primarily controlled by the presence of low molecular weight ingredients such as sugars and salt. Thus, food compositions having lower water activities are realized when the present pellet doughs contain higher sugar and salt levels. Therefore, the water activity can be simply controlled by varying the selection and mixture of low molecular weight ingredients as well as their concentration.

A wide variety of direct and indirect analytical techniques exist which accurately measure food compositions' water activities and are well known in the food art. Indirect methods of water activity measurement are especially popular due to the availability of easy-to-use electric hydrometers. A more detailed discussion of numerous water activity measurement techniques and measurement apparatus can be found in "Water Activity and Food," by John A. Troller and J. A. B. Christian, (1978), Chapter 2, pp. 17–28, published by Academic Press and which is incorporated herein by reference.

Optional Puffing Media Ingredients

Edible Fatty Triglyceridic Material

In one preferred embodiment, the present puffing media comprise from about 0.1% to 30%, preferably from about 2% to 25% of an edible fatty triglyceridic material. Puffing media comprising such fatty triglyceridic materials provide further advantages in hot spotting minimization. Such puffing media also provide puffed snacks with glazed coatings which are less tacky than glazed coatings formed by puffing media prepared without the fatty material. However, excessively high triglyceridic material levels are to be avoided since organoleptically undesirable glazed coatings might result. Further, since fatty materials readily absorb microwave radiation, puffing media comprising excessive fatty material levels tend adversely to selectively absorb the microwave energy. The excessive microwave absorption causes excessive heating of the media which can result in splattering and/or excessive or "run-away" heating of the media. Such excessive heating can cause the triglyceridic material to quickly exceed the smoke point temperature of the material. In severe over-heating, oil fires might occur.

Suitable edible fatty triglyceridic materials include for example, those derived from any of the naturally occurring glyceridic materials such as soybean oil, cottonseed oil, peanut oil, sesame seed oil, sunflower seed and palm oil. Other suitable edible fatty triglyceridic materials and methods of their preparation are described in detail in Bailey "Industrial Oil and Fat Products," published by John Wiley & Sons Publishing Company, N.Y. Typically, such materials will be partially hydrogenated (i.e., to an Iodine Value of less than about 80) to extend shelf storage.

Fatty materials containing substantial amounts of protein (i.e., greater than 1% by weight) such as cheese are to be avoided. During microwave heating or upon extended storage, the proteins can detrimentally react with reducing sugars of the essential nutritive carbohydrate sweetening component yielding undesirable reaction products and flavors. However, fatty materials having residual protein contents, (i.e., less than 1% by weight) such as butter (0.6% protein by weight) can be used. When butter is employed in the puffing media, best results are achieved when the nutritive carbohydrate sweetening agent comprises at least 50% by weight of the sweetening agent of sucrose which is a non-reducing sugar.

Most surprisingly, food grade emulsifiers are not required in puffing media comprising such fatty triglyceridic materials to yield the coated snack foods of the present invention upon microwave heating. However, food grade emulsifiers can optionally be employed to prevent any aesthetically undesirable phase separation which might occur upon storage of the present food compositions.

Minor Puffing Media Ingredients

Conventional minor optional ingredients such as coloring agents, flavors, vitamins, preservatives and the like can also be added to the puffing media. If present, such minor optional ingredients comprise from about 0.1% to 2% by weight of the puffing media.

Composition Preparation

The puffing media is prepared separately from the puffable dough pieces. The puffing media is prepared by simply blending or admixing together in any manner and in any order the puffing media essential and optional components. The puffing media forms a paste-like semi-solid form due to its high sugars level. The puffable pieces are then simply blended with the puffing media until a uniform dispersion, more or less, is prepared.

Composition Use

The food compositions of the present invention can be used to prepare a puffed coated snack product upon microwave heating. The food composition can be placed on the bottom of an uncovered container and heated by microwave until the puffable dough pieces slowly expand to form puffed products having volumes several times that of the unheated pieces. Upon cooling, the puffed snack food products are crisp and light and have a glossy, sweet coating.

The food compositions herein are generally marketed in combination with some type of conventional packaging or dispensing means. Such means include wrappers, pouches, tubes, extruding devices and the like.

The food compositions of the present invention are illustrated by the following examples:

EXAMPLE I

A food composition of the present invention comprising a plurality of puffable dough pellets prepared from amylopectin dough and a puffing medium is prepared having the following formulation:

| COMPONENT | | AMOUNT |
|---|---|---|
| A. Puffable Dough | | 681.1 g. |
| Ingredient | Amount | % by Weight |
| Corn meal[1] | 317.4 g. | 46.5% |
| Sucrose | 52.8 | 7.8 |
| NaCl | 17.4 | 2.6 |
| Pregelatinized waxy maize starch[2] | 211.8 | 31.1 |
| Moisture | 81.7 | 12.0 |
| | 681.1 g. | 100.0% |
| B. Puffing Medium | | 1,826.6 g. |
| Ingredient | Amount | % by Weight |
| Sucrose | 500.0 g. | 27.37% |
| Brown sugar | 500.0 | 27.37 |
| Butter | 460.0 | 25.18 |
| Corn syrup[3] | 340.0 | 18.62 |
| Caramel flavor | 16.6 | 0.91 |
| Brown sugar flavor | 10.0 | 0.55 |
| | 1,826.6 g. | 100.00% |

[1]Having an amylopectin content of about 56%.
[2]"Instant Pure Flo F" marketed by National Starch Company and having an amylopectin content of about 100%.
[3]Staley's Sweetose 4300 (64 DE) and having a moisture content of 18.2%.

In Example I, the puffable dough is prepared by charging a Readco Z arm mixer equipped with a steam jacket with 400 g. of water, the corn meal, salt and sucrose, and then is heated with moderate agitation until the mixture begins to boil. Cooking is continued for 75 minutes to completely gelatinize the corn meal. Thereafter, the pregelatinized starch is added. The agitation is continued until a homogenous dough is formed (approximately 20 minutes). The moisture content of the dough is 40%. The dough is charged through a laboratory extruder and extruded through 3/16 inch die orifice into long strands. After extrusion, the strands are dried for approximately one hour and then sliced into pieces approximately ¼ inch long. The puffable amylopectin dough pellets are dried at room temperature (68° F.) and humidity (40% relative humidity) until a 12% moisture content is obtained (approximately 12–16 hours). The total amylopectin starch content is calculated to be about 52%. Each pellet weighs approximately 0.4 g.

The puffing medium is prepared by adding to a Hobart mixer (Model c-100) the sucrose, and the flavors. Then, the brown sugar, corn syrup and melted butter are sequentially added and blended until the mix is uniform. The consistency of the puffing medium so prepared is paste-like. The moisture content is determined to be about 7.3% by weight. The total protein contents calculated to be less than about 0.15% by weight of the puffing medium.

The food composition of the present invention is prepared by adding the puffable dough pellets to the puffing medium and mixing until well dispersed therethrough. The food compositions so prepared are useful for the provision of a coated, puffed snack product upon heating in a conventional microwave oven. The water activity of the food composition is about 0.65 or less.

Approximately 170 g. of the food composition are placed into a 1½ quart microwave-proof bowl. The bowl is placed in a consumer microwave oven, and is heated at full power for 2 minutes. The bowl is removed from the oven and stirred twice with a spatula. The food product is then heated again for 30 seconds at full power.

The pellets are expanded to a volume of 2× to 5× their original size, and are evenly coated by a caramel glazed coating. After cooling between 2–3 minutes, the puffed snacks are ready for consumption.

Compositions of substantially similar physical/organoleptic character are realized when in the Example I food composition the corn meal is replaced with an equivalent amount of rye flour, wheat flour, oat flour, rice flour or barley flour.

EXAMPLE II

A food composition of the present invention having the following formulation is prepared:

| COMPONENT | | AMOUNT |
|---|---|---|
| A. Puffable Dough | | 1,000 g. |
| Ingredient | Amount | % by Weight |
| Degerminated corn meal[1] | 499.6 g. | 49.96% |
| Pregelatinized waxy maize starch[2] | 233.0 | 23.30 |
| Sucrose | 77.7 | 7.77 |
| Cocoa | 44.1 | 4.41 |
| Salt | 25.6 | 2.56 |
| Moisture | 120.0 | 12.00 |
| | 1,000.0 g. | 100.00% |
| B. Puffing Media | | 500 g. |
| Ingredient | Amount | % by Weight |
| Sucrose | 264.80 g. | 52.96% |
| Corn syrup[3] | 94.45 | 18.89 |
| Coconut Oil[4] | 127.75 | 25.55 |
| Water | 13.00 | 2.60 |
| | 500.00 g. | 100.00% |

[1]Having an amylopectin content of about 56%.
[2]Having an amylopectin content of about 100%.
[3]Sweetose 4300 manufactured by Stlaey Mfg. Co., having a moisture content of 18/2%.
[4]Having an I.V. of less than 11 and a melting point of 92° F.

Such a food composition is prepared in a manner similar to that described in Example I. The puffing media is calculated to have a moisture content of 6% dry weight of the puffing media. The composition so produced is in the form of a puffing media/puffable pieces matrix and is useful in the preparation of puffed snack products coated with a glazed caramel coating. The water activity is about 0.65 or less. Upon microwave heating in a conventional consumer microwave oven, the half products of the food compositions slowly puff to a size approximately 3×–5× their original volume. Puff success rates are exceeding 95% and are exhibited by the food composition. The puffable pieces exhibit minimal hot spotting as evidenced by either patching or textural impairment.

EXAMPLE III

A food composition of the present invention having the following formulation is prepared:

| COMPONENT | | AMOUNT |
|---|---|---|
| A. Puffable Dough | | 1,000 g. |
| Ingredient | Amount | % by Weight |
| Degerminated corn meal[1] | 499.6 g. | 49.96% |
| Pregelatinized waxy maize starch[2] | 233.0 | 23.30 |
| Sucrose | 77.7 | 7.77 |
| Cocoa | 44.1 | 4.41 |
| Salt | 25.6 | 2.56 |
| Moisture | 120.0 | 12.00 |
| | 1,000.0 g. | 100.00% |
| B. Puffing Media | | 350 g. |
| Ingredient | Amount | % by Weight |
| Sucrose | 250 g. | 71.42% |
| Corn syrup[3] | 100 | 28.58 |
| | 350 g. | 100.00% |

[1] Having an amylopectin content of about 56%.
[2] Having an amylopectin content of about 100%.
[3] Sweetose 4300 manufactured by Staley Mfg. Co. and having a moisture content of 18.2%.

Such a food composition is also prepared in a manner similar to that described in Example I. The puffing medium is calculated to have a moisture content of 5.2 dry weight of the puffing medium. The composition so produced is in the form of a puffing medium/puffable pieces matrix and is useful in the preparation of puffed snack products coated with a glazed caramel coating. The water activity is about 0.65 or less. Upon microwave heating in a conventional consumer microwave oven, the dough products of the food compositions slowly puff to a size approximately 3×–5× their original volume. Puff success rates exceeding 95% are exhibited by the food composition. The puffable pieces exhibit minimal hot spotting as evidenced by either discoloration or textural impairment.

The puffed food products can also be used as a cold breakfast cereal and eaten with milk. Such sugary coated cereal embodiments are preferably prepared from food compositions of the present invention wherein the puffing media do not contain fatty triglyceridic materials as optional components. Surprisingly, the coated snack products remain crisp in milk for extended periods compared to commercial sugar coated ready-to-eat cereals.

What is claimed is:

1. A process for preparing a sugary coated snack product by microwave heating, comprising the steps of:
   A. forming a gelatinized starch-containing dough having a moisture content of about 12% to 25% by weight;
   B. shaping the dough into a plurality of discrete pieces;
   C. partially drying said pieces at a temperature of about 70° F. to 200° F. and at a relative humidity of at least 35% for a period of time sufficient to reduce the moisture content of the pieces to between about 5% to 15%;
   D. dispersing the partially dried pieces throughout a puffing medium consisting essentially of, from about 40% to 95% by weight of the puffing medium, a nutritive carbohydrate sweetening agent and from about 5% to 10% by weight moisture, wherein the puffing medium is substantially free of protein sources and wherein the weight ratio of puffing medium to the pieces is about 0.1:1 to 4:1, to form a puffing medium/piece matrix; thereafter
   E. microwave heating the matrix for about 1-4 minutes to form a plurality of puffed pieces enrobed in a sugar coating; and,
   F. cooling to room temperature to harden the sugar coating on the puffed pieces.

2. A process in accordance with claim 1 wherein the puffing medium additionally comprises from about 0.1% to 30% by weight of an edible fatty triglyceride.

3. A process in accordance with claim 2 wherein the weight ratio of puffing medium to the pieces is about 1.6:1 to 3.0:1.

4. A method in accordance with claim 3 wherein the dough pieces range between about 0.01 to 6.0 g. in weight.

* * * * *